(12) United States Patent
Finke-Anlauff

(10) Patent No.: US 7,221,330 B2
(45) Date of Patent: May 22, 2007

(54) FOLDING TERMINAL WITH SLIDER TO FIX TERMINAL IN A FLAT UNFOLDED CONFIGURATION

(75) Inventor: Andrea Finke-Anlauff, Braunschweig (DE)

(73) Assignee: Nokia Corporation, Espoo (FI)

( * ) Notice: Subject to any disclaimer, the term of this patent is extended or adjusted under 35 U.S.C. 154(b) by 435 days.

(21) Appl. No.: 10/316,146

(22) Filed: Dec. 9, 2002

(65) Prior Publication Data

US 2004/0108968 A1 Jun. 10, 2004

(51) Int. Cl.
*G09G 5/00* (2006.01)

(52) U.S. Cl. .................. 345/1.1; 345/156; 345/169

(58) Field of Classification Search .......... 345/1.1–1.3, 345/2.2, 156–169, 173–180; 178/18.01–18.07, 178/19.01–19.06
See application file for complete search history.

(56) References Cited

U.S. PATENT DOCUMENTS

| | | | |
|---|---|---|---|
| 6,088,220 A | 7/2000 | Katz | 361/680 |
| 6,362,440 B1 * | 3/2002 | Karidis et al. | 178/18.01 |
| 6,366,935 B2 | 4/2002 | Hawkins et al. | 708/100 |
| 6,437,773 B1 | 8/2002 | Kornmayer et al. | 345/169 |
| 6,727,894 B1 * | 4/2004 | Karidis et al. | 345/174 |
| 6,751,090 B1 | 6/2004 | Yang | |
| 6,778,383 B2 | 8/2004 | Ho | |
| 6,801,796 B2 * | 10/2004 | Finke-Anlauff | 455/575.3 |
| 6,850,226 B2 * | 2/2005 | Finke-Anlauff | 345/169 |
| 2002/0047832 A1 | 4/2002 | Horiuchi et al. | 345/168 |

* cited by examiner

*Primary Examiner*—Vijay Shankar (57) ABSTRACT

A user terminal combining touch-screen and keyboard functionality, and also combining laptop and flat-pad layouts. The flat-pad layout can be locked into place using sliding pieces. The terminal comprises a base including a keyboard, a first display screen attached to the base along a primary fold line, a second display screen included in the base and located between the keyboard and the primary fold line, and at least one sliding piece for fixing the second display screen in a substantially flat configuration with the first display screen and/or with another part of the base. The first display screen, the second display screen, and the keyboard have substantially the same width, in order to fully utilize the width of the entire user terminal. This user terminal has a simple mechanical structure, having less than three fold lines, and the keyboard may be detached to reveal additional screen space.

29 Claims, 7 Drawing Sheets

FOLDING TERMINAL WITH SLIDER TO FIX TERMINAL IN A FLAT UNFOLDED CONFIGURATION

FIELD OF THE INVENTION

The present invention relates generally to the field of computer terminals, and more particularly to computer terminals arrangeable for portable use and communication, commonly known as laptops.

BACKGROUND OF THE INVENTION

Existing laptop-style computers or communication terminals are convenient to carry if they are small, but such devices can become difficult to use when they are too small. Typically, one of these devices includes a screen part that folds down on a keyboard part, along a primary fold line. If the screen is too small, the screen becomes difficult to read and can be harmful to eyesight. This problem of size reduction without visual drawbacks is a major challenge for makers of portable computers or terminals. One recent contribution to this field is the pocket computer of Katz (U.S. Pat. No. 6,088,220), wherein both the keyboard and the display screen have fold lines. However, a device with multiple fold lines, such as the Katz invention, is more difficult and expensive to construct than a device having only one or two fold lines. So, the problem remains how to make a small laptop-type device with only one or two fold lines, without jeopardizing the user's eyesight.

It is well-known that portable computers or terminals can operate in a touch mode, for example using a finger or stylus to directly contact the screen, in which case the screen is responsive to touch. Such a device is described by Hawkins et al. (U.S. Pat. No. 6,366,935), and may operate in touch mode, or in a more conventional laptop mode requiring a keyboard. The combination of keyboard and touch mode presents some problems that are not solved by Hawkins. Especially when using the device in touch mode, it is often desirable for the device to be in a flat position, much like a conventional writing pad, and Hawkins describes such a configuration in which the screen lies on top of the keyboard in the pad mode—Hawkins' screen faces up instead of facing down as is usual with laptops in the folded position. Hawkins' computer in its folded position provides no protection for the screen, because the screen is facing up. Also, Hawkins' screen can be no bigger than the keyboard piece upon which the screen lies, and again this can make the screen difficult to read and look at, unless the keyboard piece is sufficiently large.

Some existing laptop devices have been designed in such a way that the laptop's keyboard can be detached. For example, Kornmayer (U.S. Pat. No. 6,437,773) features a detachable keyboard. This serves two purposes in Kornmayer: first, removal of the keyboard from the housing allows easy access to the housing for maintenance purposes; second, operation of the keyboard at a greater distance from the display may be advantageous from an ergonomic viewpoint. Similarly, Horiuchi (U.S. application Ser. No. 20020047832) discloses a detachable keyboard, so that a user having no special skills can remove or insert the keyboard. This feature may be useful, for example, when a keyboard having foreign characters is desired, or when a keyboard becomes damaged and needs to be replaced; e.g. a user may spill coffee on the keyboard and therefore order a replacement keyboard. A problem with these prior art detachable keyboards is that they do not offer the user additional functionality, tools, or resources using the area of the terminal that becomes exposed when the keyboard is removed. Katz, Hawkins, Kornmayer, and Horiuchi are incorporated herein by reference in their entireties, in order to facilitate a fuller understanding and enablement of the present claimed invention.

SUMMARY OF THE INVENTION

The present invention provides a folding computer device that has a screen bigger than the device in its folded position, and thus solves the problem of reducing size without causing visual problems. This is accomplished by having a screen split into two parts that are joined at the device's primary fold line. The keyboard and one of the screens are on the same piece of the device, and thus are not separated by the primary fold line.

The present invention provides a helpful way to combine keyboard with touch mode functionality. Because touch mode functionality renders a flat device configuration desirable, the present invention discloses a flat configuration, and sliding pieces for fixing the device in that flat configuration. Thus, the two screens unite in the flat configuration. When the sliding pieces slide away to allow the device to be closed, no screen faces outward in an unprotected folded position.

The user terminal of the present invention comprises a base including a keyboard, a first display screen attached to the base along the primary fold line, a second display screen included in the base and located between the keyboard and the primary fold line, and at least one sliding piece for fixing the base and the first display screen in a substantially flat configuration in which the first display screen, the second display screen, and the keyboard form a substantially flat surface. In this invention, the first display screen, the second display screen, and the keyboard have substantially the same width, in order to fully utilize the width of the entire user terminal. This user terminal has a relatively simple and economical layout, having only one or two fold lines.

Each of the sliding pieces is for sliding along a side of the portable folding user terminal, and for fixing the portable folding user terminal in a flat unfolded configuration. The sliding piece comprises at least one finger contact surface, and at least one terminal contact surface.

In some embodiments, the keyboard of the present invention is detachable by the user. This provides the advantages of prior art detachable keyboards, plus detachment of the present keyboard would optionally reveal an exposed area of the base that includes at least one feature available to the user when the terminal is operable. For example, removal of the keyboard may expose a larger display screen. Likewise, another embodiment of the present invention has a primary fold line that is also a detachment line, so that the user is able to carry only the base which includes the keyboard and the second display screen. In this case, a secondary fold line advantageously separates the keyboard from the second display screen, and the sliding piece has sufficient length to cover both fold lines at once.

BRIEF DESCRIPTION OF THE DRAWINGS

Other features and advantages of the present invention will become readily apparent from the following description and drawings wherein.

DETAILED DESCRIPTION OF THE PREFERRED EMBODIMENTS

Figure 1:
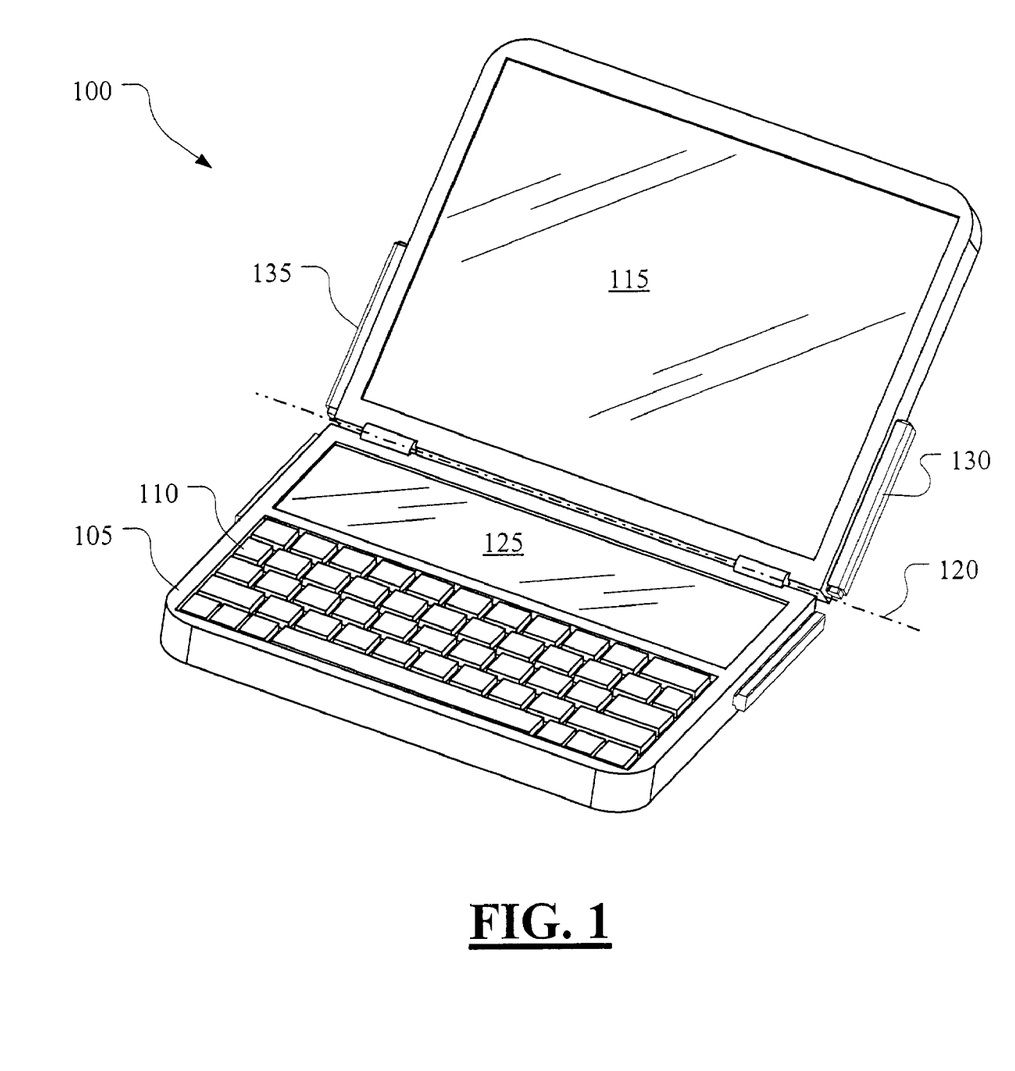
FIG. 1 is a perspective view showing a laptop device according to the present invention, with two screens separated by a primary fold line, and two sliding pieces.

Turning now to the drawings and considering FIG. 1 in particular, we see that the user terminal 100 has a base 105 including a keyboard 110. The terminal also has a first display screen 115, and a primary fold line 120. In these respects, the user terminal of FIG. 1 is similar to typical laptop computers. The primary fold line typically operates by means of hinges, or some other flexible device or material.

FIG. 1 also shows a second display screen 125 included in the base 105, between the keyboard 110 and the primary fold line 120. This second screen 125 is available for tools, phone status, mini-desktop applications, et cetera. FIG. 1 furthermore shows a right sliding piece 130 for fixing the base 105 and the first display screen 115 in a substantially flat configuration, although the sliding piece 130 in FIG. 1 is not positioned for the flat configuration. FIG. 1 also shows a left sliding piece 135.

Figure 2:
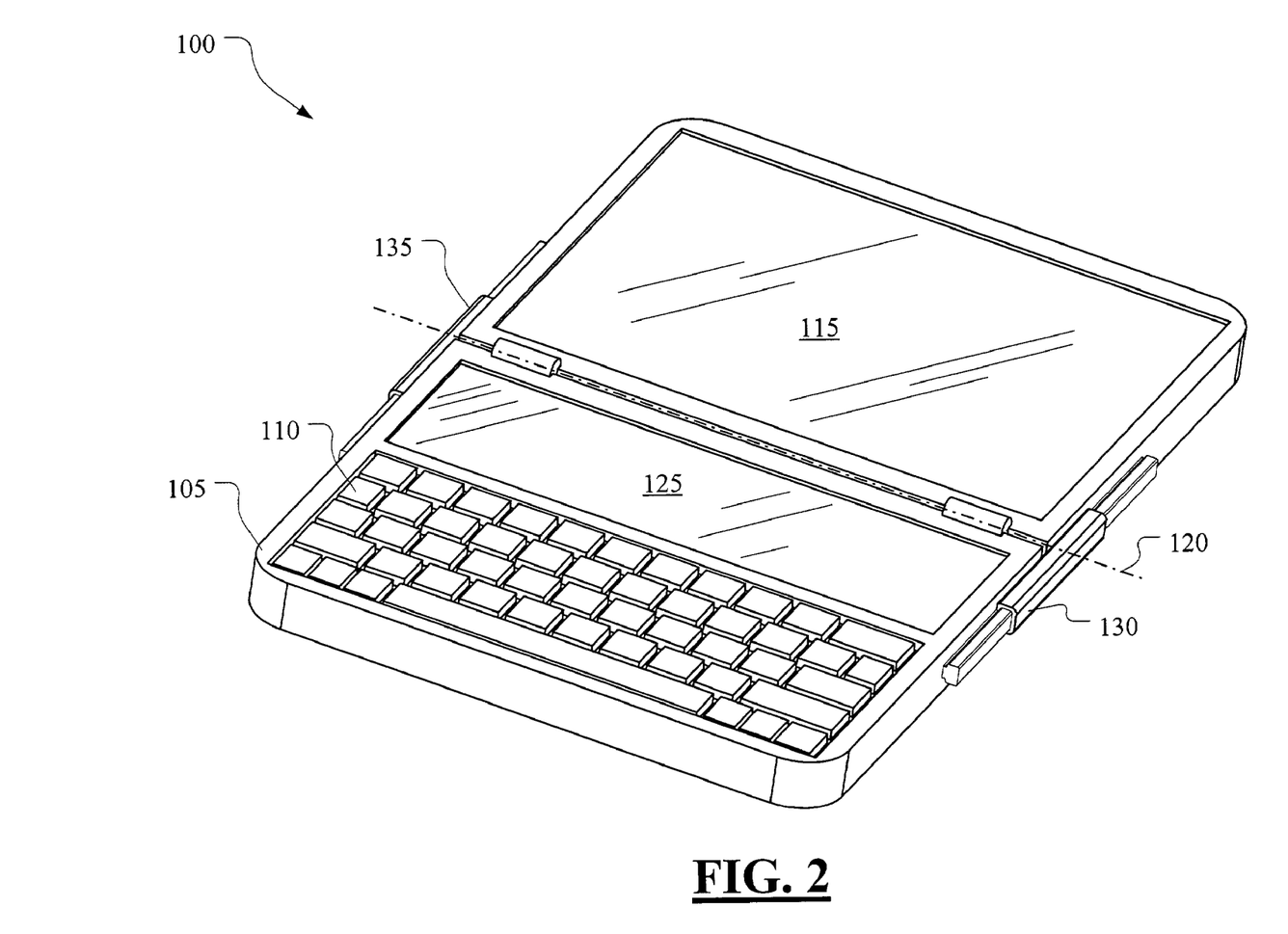
FIG. 2 is a perspective view showing the device of the present invention in a flat unfolded configuration that is secured by the two sliding pieces.

The flat configuration is shown in FIG. 2, in which the right sliding piece 130 and the left sliding piece 135 straddle the primary fold line 120, and in which the user terminal is fully unfolded to 180 degrees forming a pad. The two sliders 130 and 135 are shown slid into positions at opposite ends of the primary fold line 120 so as to fix the base 105 and the first display screen 115 in the substantially flat configuration. The two sliders slide along lines parallel to each other, and perpendicular to the primary fold line, and these sliders are preferably decorative in design.

The user terminal in the substantially flat configuration of FIG. 2 has at least a touch mode option in which the first display screen 115 and the second display screen 125 appear as one big screen responsive to touch, and a pointer or cursor is freely movable between the first display screen and the second display screen. The user terminal in the flat configuration of FIG. 2 also has a laptop mode option requiring use of the keyboard 110, and a mouse, trackball, finger pad or similar device for moving the pointer or cursor.

The functionality of the additional screen 125 may advantageously be different from that of the first screen 115. For example, the additional screen 125 accommodates a tool zone, so as to join certain functions closer to the keyboard, while reducing clutter in the first screen 115. The additional screen 125 preferably includes items such as a status zone indicating things like connectivity and inbox condition, and such as a news ticker, shortcuts to programs, documents, particular web sites, space for additional opened applications like a music player or calendar, screen notes that can be seen while presenting content of the main screen 115, and yellow "stickies." The additional screen 125 can also be used as an extension to the big screen 115, for example to scroll web page lists.

The dual screens 115 and 125 allow the biggest possible screen area on the smallest feasible dimensions. In the flat configuration, the user terminal 100 may be as large as a piece of A4 or A5 paper, and in that case does not look like a tiny toy resembling prior art subnotebooks. In the flat configuration, when the touch mode option is active instead of (or in unison with) the keyboard option, the visibility of the screens will be virtually as good as the visibility without the touch mode, due to advances in screen technology.

Figure 3:
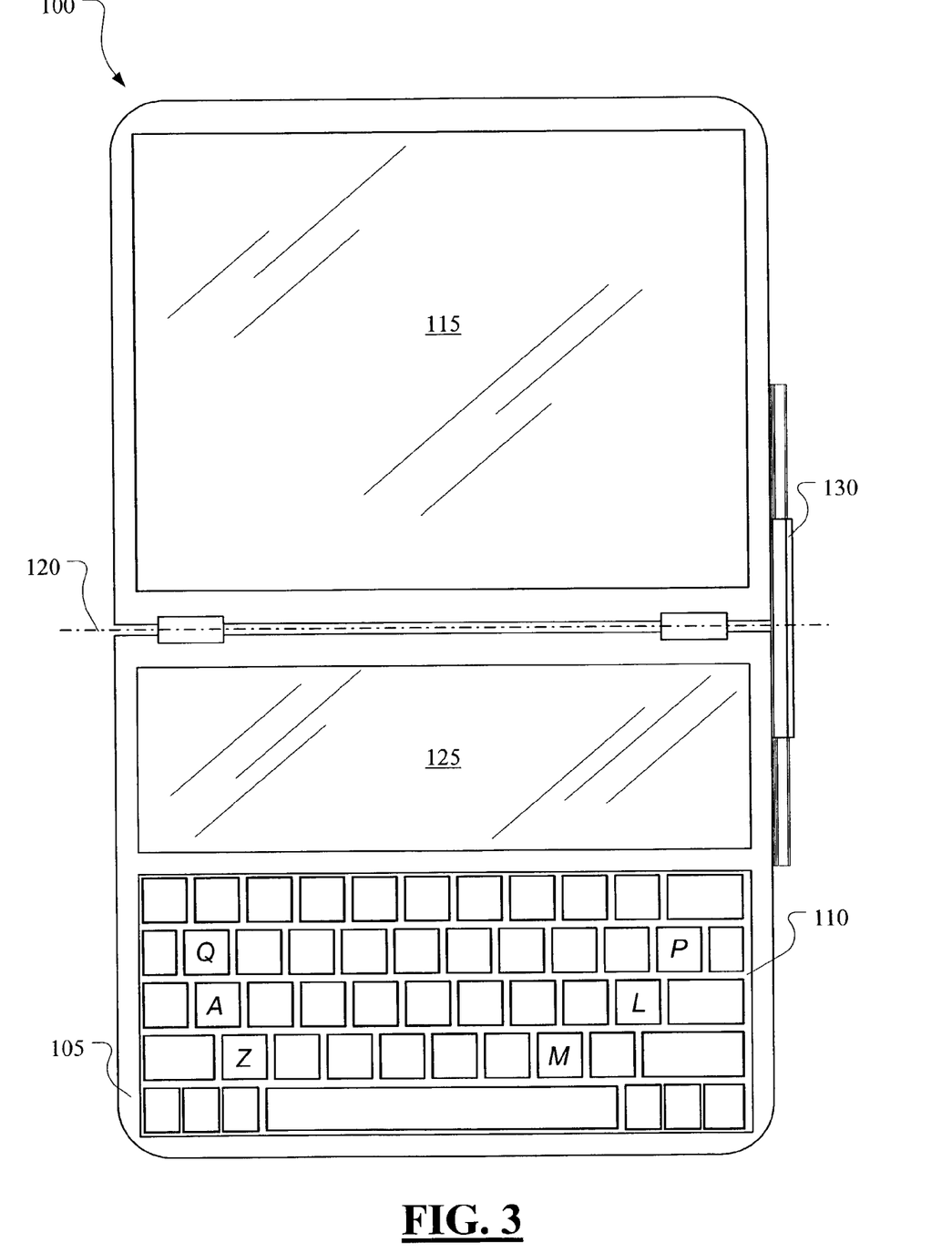
FIG. 3 is a top view of the present invention in the flat configuration, showing the QWERTY keyboard.

As shown in FIG. 3, the keyboard is a QWERTY keyboard having only one button to the left of the Q button and having only one button to the right of the P button, and wherein the button to the left of Q and the button to the right of P have respective widths less than or equal to the width of the Q button. FIG. 3 illustrates that the first display screen 115, the second display screen 125, and the keyboard 110 have substantially the same width, which takes full advantage of the width of the user terminal 100. Prior art laptops typically have a total of 14 characters on the same line with the Q button, but, according to this embodiment of the present invention, there are only 12 buttons, which allows the user device 100 to be more narrow. Of course, narrowness could also be achieved by using characters having a shrunken size, whether the number of characters per line is 14 or less.

Figure 4A:
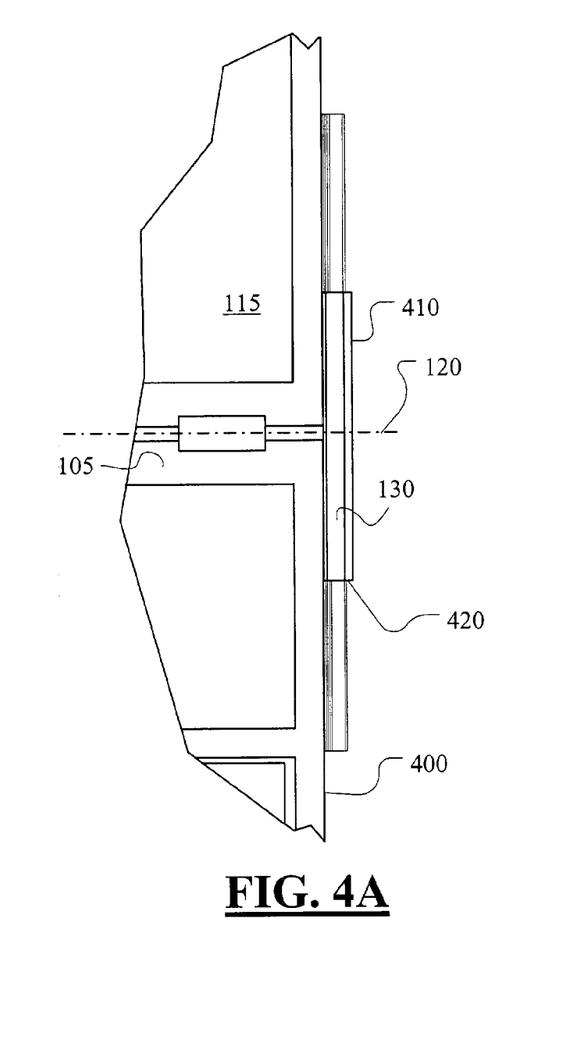
FIG. 4A is a top view of a sliding piece in the flat configuration.

The remaining figures show more detail of the sliding piece according to the present invention. As shown in FIG. 4A, the sliding piece 130 is for sliding along a side 400 of the portable folding user terminal, and for fixing the portable folding user terminal in a flat unfolded configuration. The sliding piece comprises at least one finger contact surface 410, and at least one terminal contact surface 420 where the sliding piece makes contact with the rest of the terminal. FIG. 4A shows the flat configuration in which the sliding piece straddles the primary fold line 120; the user can exit the flat configuration by sliding the slider 130 so that it no longer straddles the primary fold line, for example into a position such as that shown by FIG. 1. The user does this by putting a finger on the contact surface 410 and exerting pressure sufficient to overcome the resistance at the terminal contact surface 420.

Figure 4B:
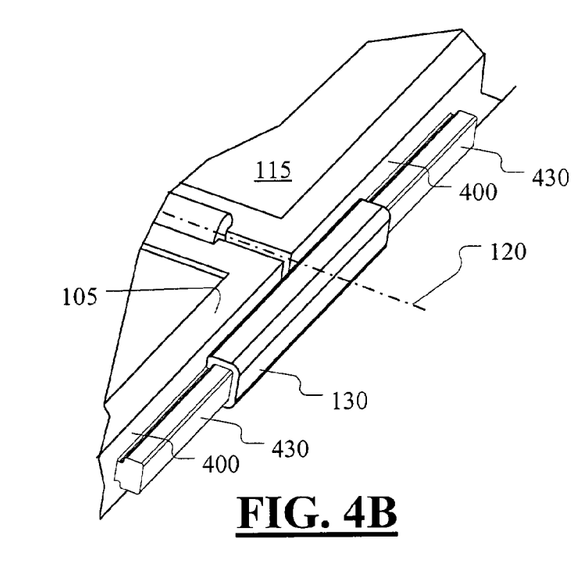
FIG. 4B is a perspective view of a sliding piece in the flat configuration.

FIG. 4B is a perspective view of what is already shown in FIG. 4A, further showing a ridge or slide 430 that protrudes from the side 400 of the user terminal. Such a ridge provides one way by which the slider 130 may attach to the side 400, and this type of attachment is shown in greater detail in FIG. 4C. The ridge may extend along the entire side 400 of the user terminal, or over only part of the side 400; the latter case would be adequate, because the slider 130 need not slide along the entirety of the side 400.

Figure 4C:
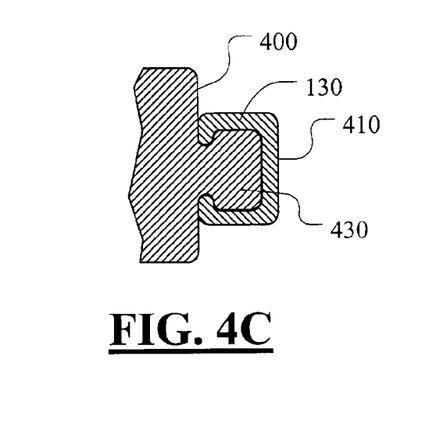
FIG. 4C shows a sliding piece gripping a side of the user terminal of the present invention.
Figure 5A:
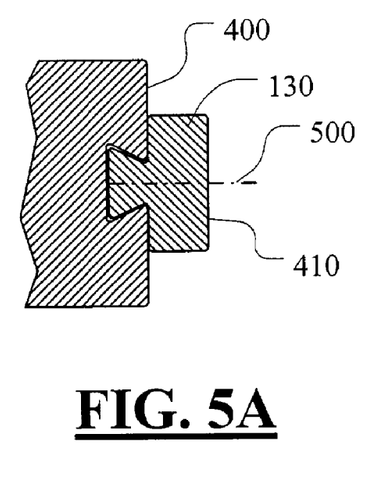
FIG. 5A shows a sliding piece anchored to the user terminal of the present invention.

Unlike the gripping structure shown in FIG. 4C, FIG. 5A alternatively shows the slider 130 anchored to the side 400 of the user terminal. Regardless of whether the slider 130 is attached to the side 400 by a gripping structure or an anchor structure, or by some other equivalent structure, the other slider 135 would be attached in the same way. Each slider is preferably symmetric with respect to a plane of symmetry 500, and thus the slider 135 and the slider 130 do not require a separate manufacture, since they are substantially the same. If the user terminal is small enough, only one slider will be sufficient to provide the required stability.

Figure 5B:
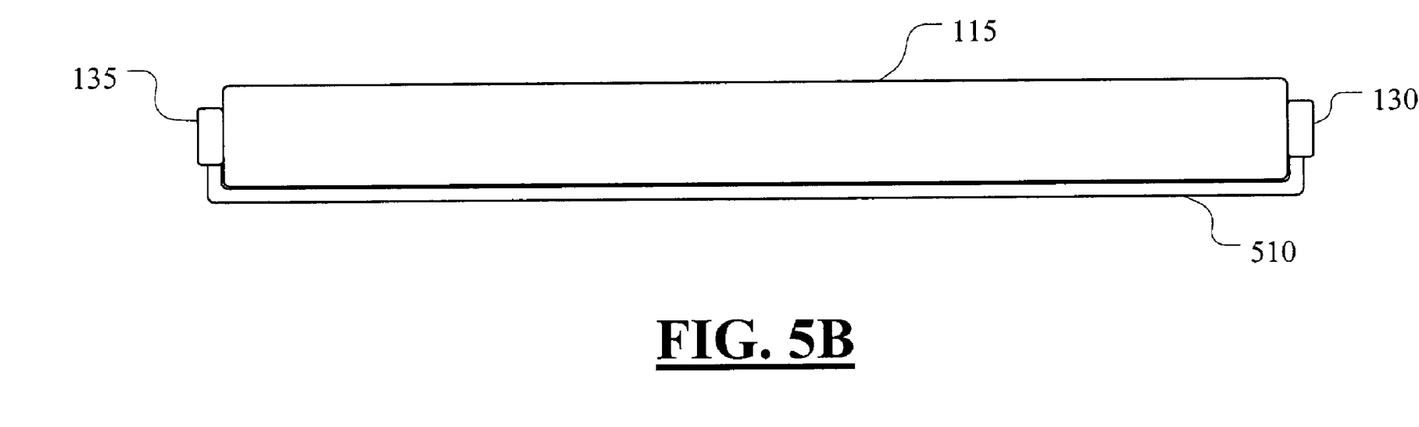
FIG. 5B shows two connected sliding pieces attached to opposite sides of the user terminal.

FIG. 5B illustrates a connector or bridging piece 510 connecting the sliders 130 and 135 to each other. This connector 510 is an option that would provide greater stability to the flat configuration, for example by ensuring that if the right slider 130 is straddling the primary fold line 120 then the left slider 135 must also be straddling the primary fold line 120.

Figure 6:
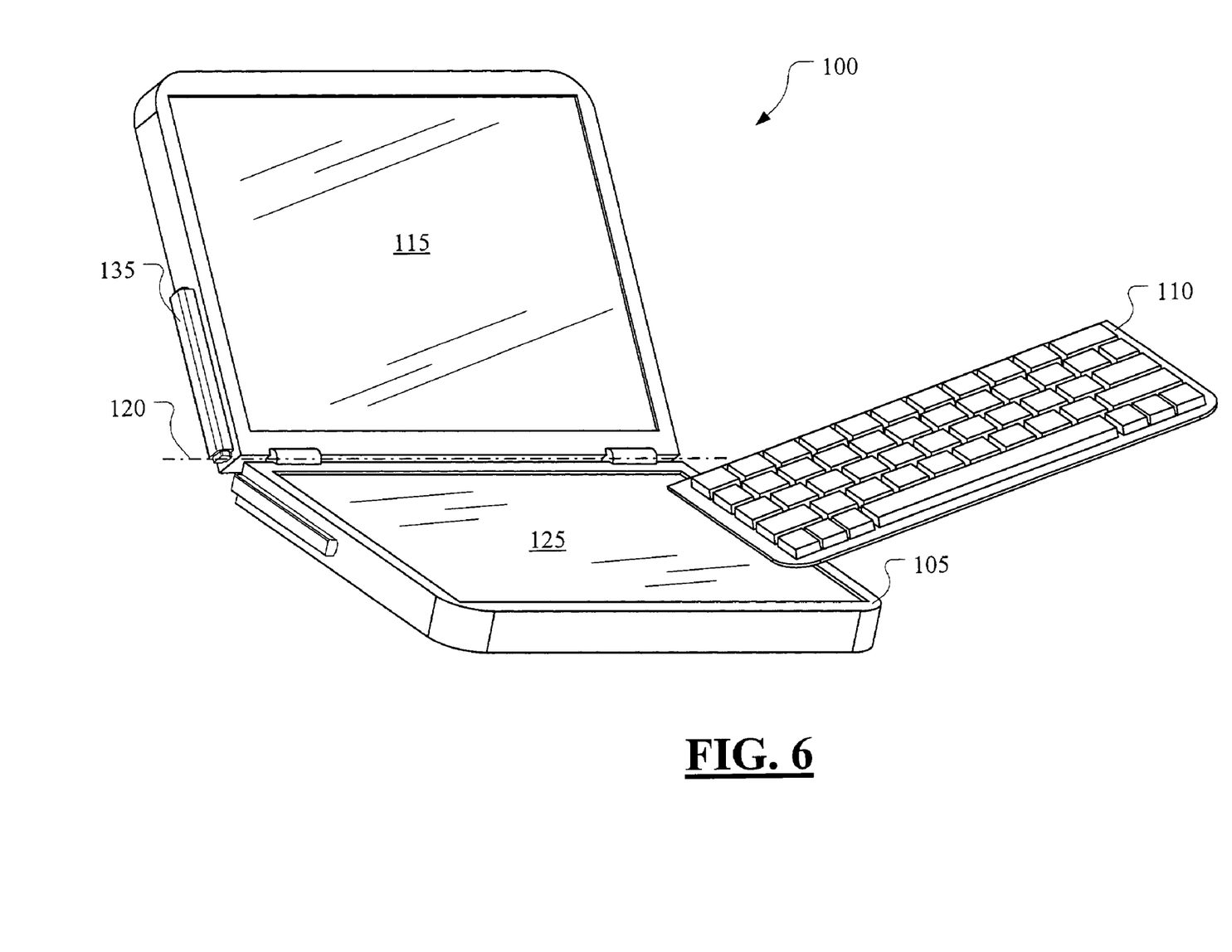
FIG. 6 shows a laptop device according to the present invention, in a perspective view, with keyboard detached.

Referring now to FIG. 6, that figure shows an embodiment of the present invention in a laptop configuration, with the keyboard 110 removed. In this embodiment, removal of the keyboard exposes a bigger display screen 125, as compared to the relatively small portion of the screen 125 shown in FIG. 1. However, FIG. 6 is merely illustrative, and alternatively removal of the keyboard 110 could instead expose other features instead of a supplementary portion of the screen 125, or could merely make the base 105 more easily accessible for maintenance or repairs, without exposing any other useful user features. Preferably, the keyboard 110 can still be used even when detached, and therefore would be connected to the rest of the user terminal by wire or by an invisible connection such as an infrared signal, as is well known in the art.

Figure 7A:
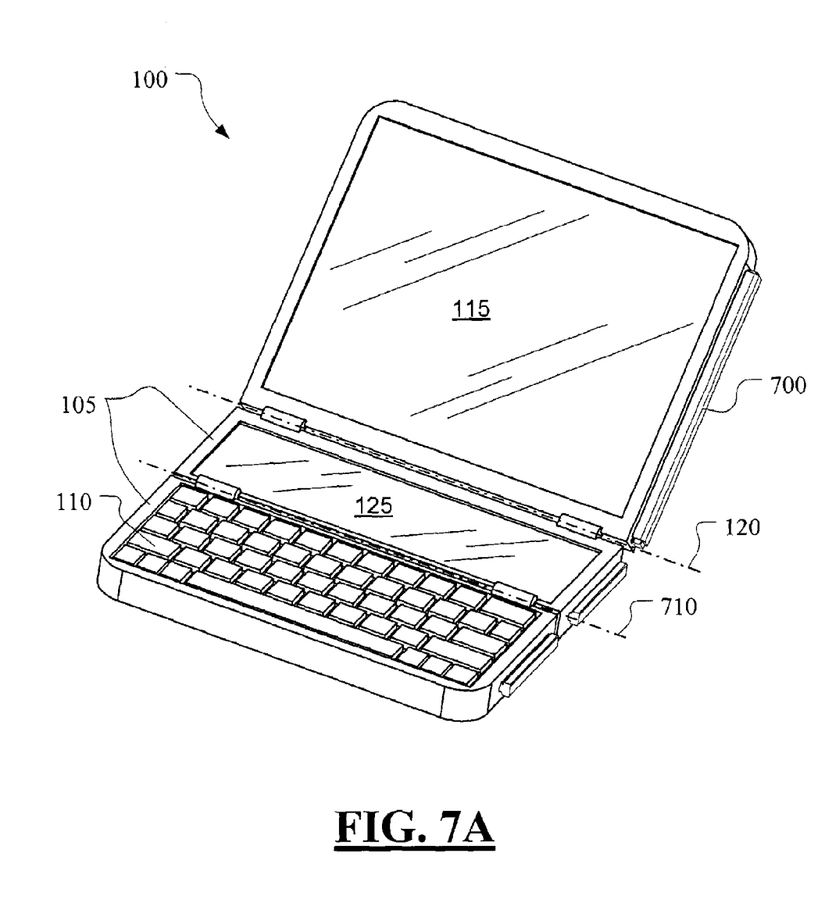
FIG. 7A shows a laptop device according to the present invention, having two fold lines and one slider, in a folded configuration.
Figure 7B:
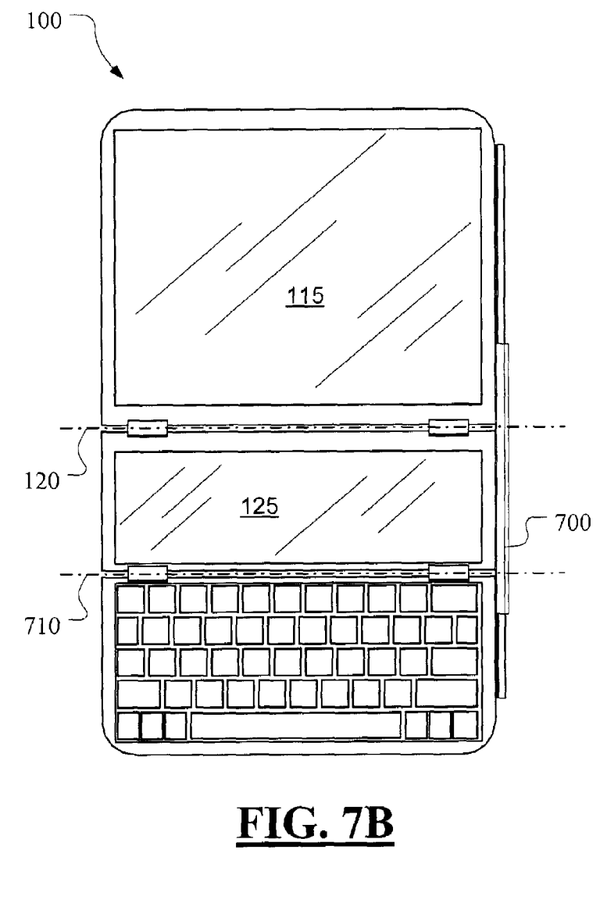
FIG. 7B shows a laptop device according to the present invention, having two fold lines and one slider, in a flat configuration.

In FIG. 7A, a laptop configuration is shown, in which the apparatus has a second fold line 710 in addition to the primary fold line 120. The slider 700 is sufficiently long so that it can cover both fold lines at once, as seen in FIG. 7B. The primary fold line 120 is also a line of detachability, so that the base 105 can be separated from the first screen 115, allowing the user to carry around the base, and to fold the base along the secondary fold line 710. The line 120 can be implemented in a number of ways that are obvious to persons skilled in the art (e.g. using loops as in a loose-leaf notebook).

In addition to the slider 700 on the right, a slider on the left, such as slider 135 in FIG. 2, becomes more advisable and necessary as the device becomes bigger or heavier. Even if the device is small and light, there are still advantages to having a short slider on the other side of the device from the long slider 700, because the slider 700 will remain with the first screen 115 when the first screen is detached along the fold line 120. Thus, the short slider on the other side remains with the base 105, and is available for straddling the second fold line 710, for example if the keyboard is detached (as described above) to reveal an additional display area.

An apparatus 100 for altering a portable terminal's configuration into a more stable alternative configuration has been described above in several preferred embodiments employing at least one slider to provide the stability. Two screens are separated by a primary fold line so that they unite as one big surface in the stabilized configuration. However, numerous modifications may be incorporated as is known to those skilled in the art of mobile terminals such as portable telephones, and therefore the invention has been described by way of illustration rather than limitation.

What is claimed is:

1. An apparatus comprising:
a base including a keyboard;
a first display screen attached to the base along a primary fold line;
a second display screen included in the base and located at least between the keyboard and the primary fold line; and
at least one sliding piece for fixing the first display screen and the second display screen in a substantially flat configuration in which the first display screen and the second display screen form a substantially flat surface,
wherein the at least one sliding piece comprises two sliders for sliding into positions at opposite ends of the primary fold line so as to fix the base and the first display screen in the substantially flat configuration, and wherein the two sliders are for sliding along lines substantially parallel to each other and substantially perpendicular to the primary fold line.

2. An apparatus comprising:
a base including a keyboard;
a first display screen attached to the base along a primary fold line;
a second display screen included in the base and located at least between the keyboard and the primary fold line; and
at least one sliding piece for fixing the first display screen and the second display screen in a substantially flat configuration in which the first display screen and the second display screen form a substantially flat surface
wherein the at least one sliding piece is for sliding substantially perpendicularly to the primary fold line.

3. The apparatus of claim 2, wherein the first display screen, the second display screen, and the keyboard have substantially the same width, and wherein the user apparatus has less than three fold lines.

4. The apparatus of claim 2, further comprising a secondary fold line located between the keyboard and the second display screen, wherein the at least one sliding piece is sufficiently long to fix both the primary fold line and the secondary fold line in a substantially flat configuration.

5. The apparatus of claim 2, wherein the second display screen has a functionality that depends at least upon whether the apparatus is in the substantially flat configuration.

6. The apparatus of claim 2, wherein, at least in a configuration different from the substantially flat configuration, the second display screen is for displaying secondary items, and wherein the secondary items include a plurality elected from the group consisting of: tools, phone status, desktop, and subset of desktop.

7. The apparatus of claim 6, wherein, at least in the configuration different from the substantially flat configuration, the second display screen has functionality for displaying a further plurality selected from the group consisting of: connectivity status, inbox status, new ticker, shortcuts, additional open applications, and notes.

8. The apparatus of claim 5, wherein the apparatus in the substantially flat configuration has at least a touch mode option in which the first display screen and the second display screen appear as one big screen responsive to touch.

9. The apparatus of claim 2, wherein a pointer or cursor is freely movable between the first display screen and the second display screen.

10. The apparatus of claim 8, wherein the apparatus in any configuration has laptop mode option requiring use of the keyboard.

11. The apparatus of claim 2, wherein the apparatus in any configuration has a laptop mode option requiring use of the keyboard.

12. The apparatus of claim 9, further comprising a trackball or finger pad for moving the pointer or cursor.

13. The apparatus of claim 2, wherein the keyboard is a QWERTY keyboard having only one button to the left of the Q button and having only one button to the right of the P button, and wherein the button to the left of Q and the button to the right of P have respective widths less than or equal to the width of the Q button.

14. The apparatus of claim 4, wherein the primary fold line is also a line of detachability.

15. A sliding piece for sliding along a side of a portable folding user terminal, and for fixing at least part of the portable folding user terminal in a flat unfolded configuration, the sliding piece comprising:
   at least one finger contact surface; and
   at least one terminal contact surface,
   wherein the sliding piece is for sliding substantially perpendicularly to a fold line of the user terminal.

16. The sliding piece of claim 15, wherein the at least one contact surface is shaped for gripping the side of the portable folding user terminal.

17. The sliding piece of claim 15, wherein the at least one contact surface is shaped for anchoring the at least one finger contact surface to the side of the portable folding user terminal.

18. The sliding piece of claim 15, wherein the sliding piece is substantially symmetric with respect to its lengthwise axis.

19. The sliding piece of claim 15, wherein the sliding piece has a left terminal contact surface for contacting the left side of the terminal, and a right terminal contact surface for contacting the right side of the terminal, and a bridging piece for linking the left terminal contact surface with the right terminal contact surface.

20. An apparatus comprising:
   a base including a keyboard;
   a first display screen attached to the base along a primary fold line;
   a second display screen included in the base and located at least between the keyboard and the primary fold line; and
   at least one slide for supporting a sliding piece that is for fixing the second display screen in a substantially flat configuration in relation to the keyboard or the first display screen
   wherein the at least one slide is substantially perpendicularly to the primary fold line.

21. The apparatus of claim 20, wherein the keyboard is detachable, and wherein the apparatus is operable both when the keyboard is attached and when the keyboard is detached.

22. The apparatus of claim 2, wherein the keyboard is detachable, and wherein the apparatus is operable both when the keyboard is attached and when the keyboard is detached.

23. The apparatus of claim 21, wherein detachment of the keyboard reveals an exposed area of the base, and wherein the exposed area of the base includes at least one feature available to the user when the apparatus is operable.

24. The apparatus of claim 23, wherein the at least one feature comprises a supplemental portion of the second display screen or an additional display screen.

25. The apparatus of claim 20, wherein the keyboard and the second display screen are separated by a secondary fold line.

26. The apparatus of claim 20, wherein the primary fold line is also a line of detachability.

27. An apparatus comprising:
   a first means, for including a keyboard;
   a second means, for displaying, the second means being attached along a primary fold line to the first means;
   a third means, for displaying, the third means being included in the first means, and the third means being located at least between the keyboard and the primary fold line; and
   at least one additional means, for sliding, the at least one additional means also being for fixing the second means and the third means in a substantially flat configuration in which the second means and the third means form a substantially flat surface,
   wherein the at least one additional means is for sliding substantially perpendicularly to the primary fold line.

28. The apparatus of claim 27, wherein the second means, the third means, and the keyboard have substantially the same width, and wherein the apparatus has less than three fold lines.

29. The apparatus of claim 27, further comprising a secondary fold line located between the keyboard and the third means, wherein the at least one additional means is sufficiently long to fix both the primary fold line and the secondary fold line in a substantially flat configuration.

* * * * *

UNITED STATES PATENT AND TRADEMARK OFFICE
CERTIFICATE OF CORRECTION

| | | |
|---|---|---|
| PATENT NO. | : 7,221,330 B2 | Page 1 of 1 |
| APPLICATION NO. | : 10/316146 | |
| DATED | : May 22, 2007 | |
| INVENTOR(S) | : A. Finke-Anlauff | |

It is certified that error appears in the above-identified patent and that said Letters Patent is hereby corrected as shown below:

At col. 6, line 27 (claim 3, line 3), please cancel the word "user" prior to "apparatus".

Signed and Sealed this

Twenty-ninth Day of July, 2008

JON W. DUDAS
*Director of the United States Patent and Trademark Office*